United States Patent [19]

Haren et al.

[11] 4,025,685

[45] * May 24, 1977

[54] COMPRESSIBLE PRINTING BLANKET AND METHOD OF MANUFACTURE

[75] Inventors: Doyle V. Haren, Clyde; Arthur D. Logan, Waynesville, both of N.C.

[73] Assignee: Dayco Corporation, Dayton, Ohio

[ * ] Notice: The portion of the term of this patent subsequent to Aug. 27, 1991, has been disclaimed.

[22] Filed: Sept. 6, 1974

[21] Appl. No.: 503,828

[52] U.S. Cl. .............................. 428/304; 101/327; 427/243; 428/309; 428/909
[51] Int. Cl.² ........................ B32B 3/00; B32B 5/14
[58] Field of Search .......... 161/159, 160, 162, 168, 161/190, 401; 428/909, 908, 305, 304, 306, 323, 308, 330, 309, 327; 101/327, 197, 407 A; 264/49; 427/243

[56] References Cited
UNITED STATES PATENTS

| | | | |
|---|---|---|---|
| 3,486,968 | 12/1969 | Mater | 161/190 |
| 3,533,900 | 10/1970 | Abell | 428/909 |
| 3,640,829 | 2/1972 | Elton | 161/159 |
| 3,795,568 | 3/1974 | Rhodarmer et al. | 161/401 |
| 3,819,471 | 6/1974 | Sohnemann | 428/909 |
| 3,898,360 | 8/1975 | Neumann et al. | 428/909 |
| 3,928,521 | 12/1975 | Haren et al. | 264/49 |

*Primary Examiner*—William J. Van Balen
*Attorney, Agent, or Firm*—Reuben Wolk

[57] ABSTRACT

A compressible printing blanket and method of manufacture, in which the blanket has at least one base fabric layer, an elastomeric face, and an intermediate compressible layer. The compressible layer is formed of a microporous material having cavities with interconnected passages. The material is made by admixing particles of hydrated magnesium sulfate in an elastomeric matrix, creating a blowing effect, and leaching the particles from the matrix.

17 Claims, 4 Drawing Figures

COMPRESSIBLE PRINTING BLANKET AND METHOD OF MANUFACTURE

CROSS REFERENCE TO RELATED APPLICATION

This application is related to U.S. application Ser. No. 428,965, filed Dec. 27, 1973, now U.S. Pat. No. 3,928,521 issued Dec. 23, 1975.

BACKGROUND OF THE INVENTION

This invention relates to compressible printing blankets and method of manufacturing such blankets. The type of blanket referred to herein is laminated and is used primarily in offset lithographic printing, but may also find utility in other fields of printing.

The use of blankets in offset lithography has the primary function of transferring the ink from the printing plate to the paper. Printing blankets are very carefully designed so that the surface of the blanket is not damaged either by the mechanical contact with the parts of the press or by chemical reaction with the ink ingredients. The repeated contacts cause a certain amount of compression of the blanket which must be within proper limits so that the image is properly reproduced without causing permanent deformation of the blanket. The blanket must be capable of eventually returning to its original thickness and provide constant transfer of the image throughout its life.

In addition to the inherent variations of the printing apparatus, conventional blankets may also have minute variations in thickness which are formed during the manufacturing steps. The existing high or low spots in such a blanket may, therefore, create uneven reproductions on the finished product.

Printing blankets utilize a base material to give the blanket integrity, and woven fabrics are preferred for this purpose. The base may consist of one, two, three, or more layers of fabric. The working surface, by which is meant the surface that actually contacts the ink, is usually an elastomeric layer made of natural or synthetic rubber which is applied over the base layer. This is usually done by calendering or spreading rubber in successively thin layers until a desired thickness of rubber has been deposited, after which the assembly is cured to provide the finished blankets. Such a blanket is perfectly acceptable for many kinds of printing, but often lacks the necessary compressibility for other operations. It is desirable, however, to have more highly compressible blankets available.

It is difficult to obtain this improved compressibility by the standard construction described above because the rubber material, while it is highly elastomeric, cannot be compressed in a direction at right angles to its surface without causing a distortion or stretch of the blanket. If irregularities exist in the printing plate, the presses, or the paper, then the compression to which the blanket is exposed will vary during the operation. Other approaches to compressible blanket design must be made.

Blanket manufacturers have introduced products in the past in an effort to create additional compressibility, such as by the use of sponge rubber, textile fibers, special fabric layers, felt, or microspheres. Some of these are described in U.S. Pat. Nos. 2,792,322; 3,147,698; 3,285,799; 3,652,376; and 3,700,541.

SUMMARY OF THE INVENTION

The present invention provides an offset blanket having a compressibility which meets all the needs of the industry. This is accomplished by providing an intermediate layer between the base fabric consisting of one or more plies, and the working surface, this intermediate layer being formed of a microporous elastomeric material having interconnected cavities. This layer is formed by admixing particles of hydrated magnesium sulfate into an elastomeric material, applying this to a fabric ply, curing the resulting matrix to liberate water from the particles to create a blowing effect, and leaching the particles. This forms the cavities in the matrix and simultaneously interconnects them to form the microporous layer. Another fabric ply is placed over this intermediate layer, and then an outer layer or working surface is spread onto the fabric ply.

The resultant blanket is thus sufficiently compressible to avoid all the irregularities in operation described above, is consistent and substantially uniform throughout, and may be controlled to achieve any desired compressibility. The term "compressibility", as used in the printing art, refers to the ability of the blanket to compress and return readily, without distortion in lateral directions. The structural integrity and cohesive strength of such an intermediate layer is high and the voids are never ruptured and thus remain intact throughout the layers regardless of the compression and expansion of the blanket.

DESCRIPTION OF THE PREFERRED EMBODIMENT

Figure 1:
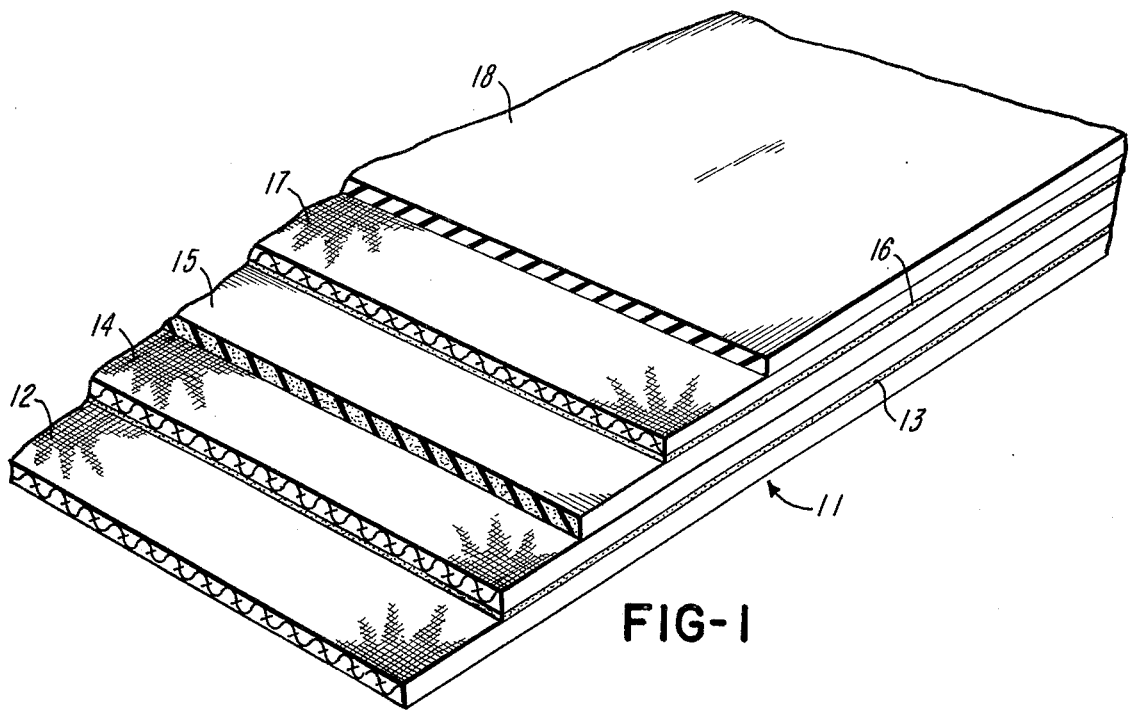
FIG. 1 is an isometric view of a segment of the novel blanket with parts broken away to illustrate the invention.

The printing blanket 11 which is illustrated in FIG. 1 consists of the base fabric which in this case is formed of two plies of woven fabric 12 and 14. It is, of course, conventional to utilize one, two, three, or even more layers as the base fabric, depending on the type of product which is desired. The specific type of fabric to be utilized will not be described in great detail since this is conventional in the manufacture of printing blankets, but the plies are usually low-stretch fabrics such as certain types of cotton, rayon, or glass. In the normal manufacturing process, each ply is formed by a single band of fabric. The plies 12 and 14 are bonded together by an adhesive layer 13, such as neoprene cement or other suitable material.

Figure 3:
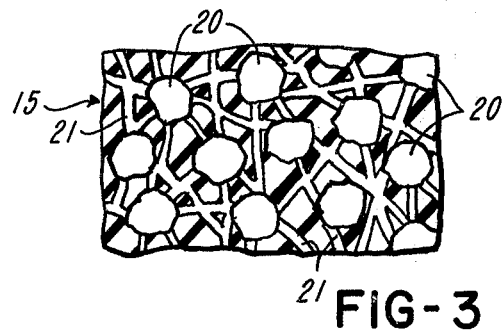
FIG. 3 is an enlarged fragmentary cross-sectional view particularly illustrating the microporous elastomeric material of this invention which comprises the compressible layer of the blanket, and particularly illustrating, in an exaggerated manner, cavities which for convenience of drawing are of roughly equal size interconnected by numerous internal channels which promote leaching.

The compressible layer 15 consists of microporous elastomeric material which will be more fully described below, and as illustrated in FIG. 3, has a plurality of cavities 20 interconnected by passages 21 of different sizes. The cavities 20 have different irregular shapes and may be of roughly equal size or may be of different sizes. The thickness of this intermediate layer is approximately 0.010 inch to 0.020 inch. Another ply of fabric 17, similar to plies 12 and 14, is placed over the layer 15. The last step in the construction is to apply the surface layer 18 of rubber by conventional spreading processes until the desired surface layer thickness is achieved (approximately 0.010 inch thick). The blanket will have an over-all thickness of approximately 0.065 inch. If desired, additional layers of adhesive, similar to layer 13, are placed between layer 15 and fabric plies 14 and 17.

Figure 2:
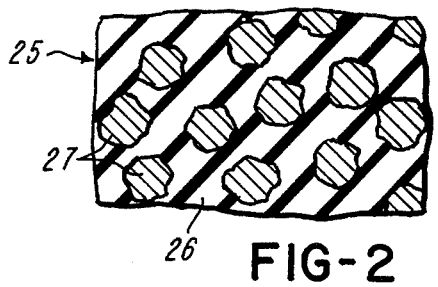
FIG. 2 is an enlarged fragmentary cross-sectional view illustrating elastomeric matrix material loaded with hydrated magnesium sulfate prior to curing and leaching.
Figure 4:
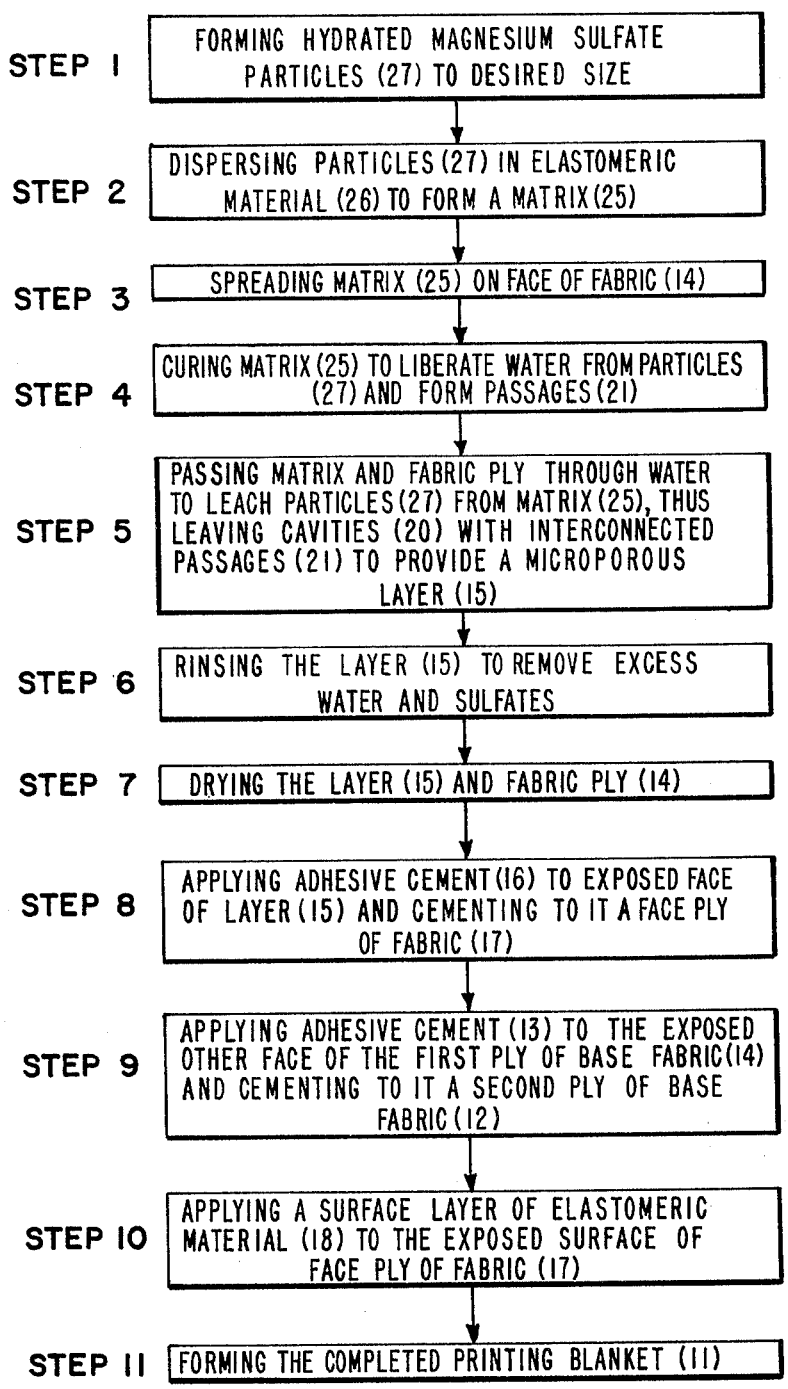
FIG. 4 is a schematic presentation particularly setting forth method steps which may be employed in making the novel printing blanket of this invention.

The unique method of making the blanket, and in particular the method of forming the microporous layer 13 will now be described in detail in connection with FIGS. 2, 3 and 4 of the drawings.

Step 1 of the procedure comprises the formation of sized particles 27 of hydrated magnesium sulfate, such as by a conventional grinding action with the sizing being achieved employing a suitable mechanical screen, or the like.

The second step consists of dispersing or admixing the particles 27 in an elastomeric material 26, and although any known technique may be employed to achieve the mixing action, such mixing is preferably achieved by introducing the sized particles together with elastomeric or rubber compound in a Banbury mixer to form a loaded rubber matrix material 25, i.e., a rubber material 26 loaded with sized particles 27 of hydrated magnesium sulfate.

In the third step, the matrix is made into a cement with a viscosity suitable to permit spreading; for example, by dissolving in a suitable solvent, such a toluene, and spreading the dissolved matrix on one face of base ply 14. The ply is formed from conventional printing blanket fabric, about 0.010 inch to 0.020 inch thick, and made of suitable yarns, such as cotton, rayon, polyester, or the like.

The fourth step involves the curing of the matrix, preferably at about four-hour exposure at a temperature of about 290° F. During the curing operation, water is liberated from the hydrated magnesium sulfate, forming interconnecting passages 21 between the particles 27.

Step 5 of the process provides the important leaching operation. This is accomplished by passing the matrix 25 and ply 14 through either hot or cold water. Hot water is preferred because the leaching is accomplished in a shorter length of time. The length of time required partially depends on the thickness of the matrix, which is spread on the fabric in a series of coats about 0.002 inch thick; anywhere from 5 to 12 coats may be commonly used. The temperature of the leaching water may be varied between about 150° F. to 212° F. and also governs the length of time required. The matrix and ply are repeatedly passed through the water until the particles 27 are dissolved, and the cavities 20 are created by the dissolution. The resultant layer 15 is microporous, and contains cavities comprising about 40% to 75% of the volume of the layer.

Step 6 involves passing the layer between squeeze rollers to remove excess water as well as the residual sulfate solution remaining in the cavities. This step may be repeated as often as necessary to accomplish these purposes.

According to step 7, the layer 15 and fabric ply are dried by any conventional process, such as hot coils of a spreading machine, oven, radiant heat, or hot air blowers. Again, the time utilized for drying may vary, but it is usually less than 3 hours.

The eighth step consists of applying a layer of adhesive cement 16 to the exposed face of the layer 15 and cementing it to a face ply 17 which is formed of conventional fabric used in printing blankets. This may be similar to fabric 14, described above. This is followed by the ninth step in which another layer of adhesive cement 13 is applied to the exposed face of base fabric ply 14 and cemented to a second ply of base fabric ply 12, of a similar constructon to plies 14 and 17.

Step 10 is a conventional one, and involves applying a surface layer of elastomeric material 18 to the exposed surface of the fabric ply 17. This surface layer may be of an elastomeric compound suitable for use in printing blankets, and is discussed in further detail below. This layer is usually applied in a spreading machine in a series of thin layers until a total of about 0.010 inch is built up.

The eleventh and final step completes the manufacture of the blanket 11, and includes conventional blanket processing such as curing at about 290° F.

Having described the improved method of this invention the detailed description will now proceed with details of the size of the particle 27, the extent of hydration of the magnesium sulfate, the amount of hydrated magnesium sulfate which may be employed in an elastomeric matrix, and finally specific examples of the method of this invention. In particular, during the step of providing sized particles of hydrated magnesium sulfate the sizing is preferably such that roughly "100 mesh" particles are provided and what is meant by "100 mesh" will be described in more detail subsequently. The hydrated magnesium sulfate preferably contains 7 molecules of water of crystallization per molecule of magnesium sulfate and the formula is written $MgSO_4 \cdot 7H_2O$. The amount of hydrated magnesium sulfate which may be used in the microporous layer 13 may comprise between 40% and 75% of the total volume of the layer 13.

Sized particles of hydrated magnesium sulfate are provided by conventional processes, such as grinding and sizing, using a mechanical screen. The sized particles are thoroughly mixed in a suitable rubber material 26 in a Banbury mixer to define a loaded matrix 25.

It will also be appreciated that hydrated magnesium sulfate containing other than 7 molecules of water per molecule of magnesium sulfate may be provided. In addition, where curing and leaching is achieved in a single step, the time required may range between 10 hours and 72 hours, depending on the dimensions of the specific blanket being processed and the temperature of the water, which may range between 150° F. and 212° F.

The matrix 25 and the surface layer 18 illustrated and described in this disclosure of the invention is an elastomeric material which has been found to be suitable for the manufacture of printing blankets, typically are synthetic elastomers, but may be natural rubber. Typical synthetic elastomers are those obtained by copolymerizing butadiene and acrylonitrile, commonly referred to as nitrile rubbers. Other materials include neoprene, polysulfide polymers, and urethane elastomers.

In this disclosure of the invention "100 mesh" particles of hydrated magnesium sulfate has been specifically mentioned; however, it is to be understood that particles of other sizes may be provided. For example, such particles may be as small as 200 mesh size or larger than 100 mesh depending upon the size of the cavities or pores desired in the microporous material.

Actually, the "100 mesh" particles of magnesium sulfate material were chosen for making an ink-dispensing article, based on what is considered to be the largest pore size which will yield a satisfactory balance between ink pickup characteristics, ink feed to a surface being printed, and freedom from so-called "misting" or ink spin-off when running.

A typical screen analysis for the "100 mesh" particles is presented below where the 100 mesh screen has an aperture measuring 0.0058 inch square, while the 140 mesh screen has an aperture measuring 0.0041 inch square.

| | |
|---|---|
| Particles retained on 80 mesh screen | .0% |
| Particles retained on 100 mesh screen | 5.0% |
| Particles retained on 140 mesh screen | 13.7% |
| Particles smaller than 140 mesh screen | 81.3% |
| | 100.0% |

From the above screen analysis, it is seen that 95% of all the material is smaller than 100 mesh, while 81.3% is smaller than 140 mesh.

The amount of hydrated magnesium sulfate in the matrix 25 may comprise 40% to 75% of the total volume of such material. During actual laboratory tests it was found that after the improved leaching action provided by the method of this invention, about 95% and more of the soluble materials had in fact been leached out and the resulting microporous material had an actual void volume of about 61% which will be considered as generally of the order of 60%. Void measurements were made indirectly by determining the weight of samples before and after leaching and drying.

While it is understood that variations in material and processes are specifically contemplated in accordance with the present invention, a specific example is set forth below:

EXAMPLE

Sized particles of 100 mesh hydrated magnesium sulfate, containing 7 molecules of water of crystallization per molecule are formed by grinding and sizing on a screen. These particles are mixed into matrix material 26 on a Banbury mixer, in a ratio of 60% of particles by volume, of the total volume of matrix. The resulting matrix 25 is thus loaded with the particles. A typical composition of the material 26 is set forth below, in parts by weight:

| | |
|---|---|
| Acrylonitrile-butadiene copolymer (26% acrylonitrile content) | 100.00 |
| Zinc oxide | 5.00 |
| Diphenylguanadine (accelerator) | 0.25 |
| Phenylbetanaphthylamine (antioxidant) | 2.00 |
| Benzothiazole disulfide (accelerator) | 1.00 |
| Clay (filler) | 40.00 |
| Brown factice (softener) | 20.00 |
| Sulfur | 2.50 |
| Stearic acid | 1.00 |
| Dibutoxyethoxy ethyl formal (plasticizer) | 15.00 |

A base ply 14 is formed of cotton duck material which has been prestretched for dimensional stability. The matrix is approximately 0.018 inch thick and is formed into a roll about 60 inches wide and 60 yards long. The matrix 25 is dissolved in toluene and spread coated upon the ply in 9 coats of approximately 0.002 inch thick until a total of 0.018 inch is reached. The coated ply is cured at a temperature of 290° F. for four hours in an oven. The resulting roll, which is 60 inches wide and 60 yards long, is then passed through water at a temperature of 180° F., which leaches the particles from the matrix. This is repeated for six passes.

The excess water and particles are removed from the material by passing it between squeeze rollers, and then the material is dried by passing it over heating coils. This drying step is repeated 30 times over a period of three hours.

The blanket is completed by conventional processes well known to the art, including the cementing of the ply and matrix to another base ply and a face ply, subsequently applying an elastomeric surface layer, and curing the blanket at about 290° F.

It should be noted that for an elastomer having a given softness and resilience, the compressibility will be increased by increasing the total void volume per unit volume of matrix. This void volume may be increased by using a higher volume loading of particles. The compressibility will also be increased by increasing the thickness of the intermediate layer, with a constant softness and resilience of the elastomer and constant total void volume. Various elastomers may be used and may be compounded to provide different degrees of softness and resilience, as known in the art. The final blanket is highly compressible as a result of the use of a compressible layer having interconnected cavities, contrasted to known blankets having closed cells. For example, the blanket may have a compression ranging between 0.004 inch and 0.011 inch under a pressure of 125 p.s.i. The sudden application of shock and pressure on the blanket is absorbed by forcing air back and forth among the cavities, somewhat in the manner of a pneumatic mechanism.

We claim:
1. A laminated printing blanket comprising at least one fabric base ply, a surface layer, and a compressible intermediate layer, said intermediate layer comprising an elastomeric matrix having interconnected cavities distributed therethrough.

2. The blanket of claim 1 having a compression of 0.004 inch to 0.011 inch under a pressure of 125 p.s.i.

3. The blanket of claim 1 in which said cavities comprise approximately 40% to 75% of the volume of said intermediate layer.

4. The blanket of claim 1 in which said cavities comprise approximately 60% of the volume of said intermediate layer.

5. The blanket of claim 1 in which said cavities are irregular in shape but approximately equal in size.

6. The method of manufacturing a laminated compressible printing blanket comprising the steps of forming a compressible layer of elastomeric material having interconnected cavities, and incorporating said layer into additional layers to form a completed blanket.

7. The method of claim 6 in which said compressible layer is formed by admixing sized particles of hydrated magnesium sulfate into an elastomeric matrix, curing the matrix, simultaneously liberating water of crystallization from said hydrated magnesium sulfate to create passages between said cavities, and leaching said particles from said matrix material.

8. The method of claim 7 in which said leaching step dissolves said particles to create said cavities.

9. The method of claim 7 in which said leaching is achieved at a temperature ranging between 150° F. and 212° F.

10. The method of claim 7 including the step of grinding and sizing hydrated magnesium sulfate to define particles of roughly 100 mesh size.

11. The method of claim 7 in which said curing and leaching steps are achieved simultaneously.

12. The method of claim 7 in which said admixing step comprises admixing said particles in an amount comprising between 40% and 75% of the volume of said layer.

13. The method of claim 7 in which said admixing step comprises admixing said particles in an amount comprising approximately 60% of the volume of said layer.

14. The method of claim 13 including the further step of rinsing the cured and leached matrix.

15. The method of claim 7 in which said curing and leaching steps are achieved using hot water at a temperature in excess of 150° F.

16. The method of claim 7 in which said curing and leaching steps are achieved simultaneously by immersing the matrix in a tank of water which is controlled to temperature ranging between 150° F. and 212° F.

17. The method of claim 7 in which said forming step comprises the further steps of rinsing the matrix with water and drying the cured, leached, and rinsed material in an oven at a temperature ranging between 300° F. and 350° F.

* * * * *

UNITED STATES PATENT OFFICE
CERTIFICATE OF CORRECTION

PATENT NO. : 4,025,685
DATED : May 24, 1977
INVENTOR(S) : Doyle V. Haren and Arthur D. Logan It is certified that error appears in the above-identified patent and that said Letters Patent are hereby corrected as shown below:

Column 1, on face page, the fourth item headed "Notice", delete "August 27, 1991" and substitute therefor -- December 23, 1992 -- .

Signed and Sealed this

Eleventh Day of April 1978

[SEAL]

Attest:

RUTH C. MASON
*Attesting Officer*

LUTRELLE F. PARKER
*Acting Commissioner of Patents and Trademark*